(12) United States Patent
Sadek et al.

(10) Patent No.: US 8,749,714 B2
(45) Date of Patent: Jun. 10, 2014

(54) DISTINGUISHING AND COMMUNICATING BETWEEN WHITE SPACE DEVICES TRANSMITTING ATSC-COMPATIBLE SIGNALS

(75) Inventors: Ahmed K. Sadek, San Diego, CA (US); Wenyi Zhang, Anhui (CN); Babak Aryan, San Diego, CA (US); Vijayalakshimi Raveendran, San Diego, CA (US); Avinash Jain, San Diego, CA (US); Stephen J. Shellhammer, Ramona, CA (US); Charles A. Bergan, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 865 days.

(21) Appl. No.: 12/652,629

(22) Filed: Jan. 5, 2010

(65) Prior Publication Data
US 2011/0164186 A1    Jul. 7, 2011

(51) Int. Cl.
*H04N 5/38*   (2006.01)
*H04N 5/44*   (2011.01)

(52) U.S. Cl.
USPC ........... 348/723; 375/350; 375/295; 375/316; 348/473; 348/486

(58) Field of Classification Search
USPC ........... 348/724, 21, 470, 735, 723, 725, 465, 348/473, 474, 558, 486; 375/316, 143, 350, 375/295, 301; 725/81, 131, 105; 455/69, 455/67.11, 101, 449; 370/252, 254, 235, 370/294
See application file for complete search history.

(56) References Cited

U.S. PATENT DOCUMENTS

| | | | |
|---|---|---|---|
| 2008/0010208 A1* | 1/2008 | Callaway | 705/57 |
| 2008/0112467 A1* | 5/2008 | Shellhammer | 375/143 |
| 2008/0165680 A1 | 7/2008 | Chang | |
| 2008/0198948 A1* | 8/2008 | Tang | 375/316 |
| 2008/0299918 A1 | 12/2008 | Jallon | |
| 2008/0309829 A1 | 12/2008 | Turkenich et al. | |

(Continued)

FOREIGN PATENT DOCUMENTS

| | | |
|---|---|---|
| WO | WO2006113929 A2 | 10/2006 |
| WO | 2007/096819 A2 | 8/2007 |

(Continued)

OTHER PUBLICATIONS

International Search Report and Written Opinion—PCT/US2011/020256, ISA/EPO—Jul. 8, 2011.

*Primary Examiner* — Michael Lee
(74) *Attorney, Agent, or Firm* — Jeffrey D. Jacobs

(57) ABSTRACT

White space signals are differentiated from licensed ATSC signals through modification of a waveform of the white space signal. White space signals may be modified by shifting the ATSC-compatible waveform so that the pilot frequency of the white space signal is at a location outside of the frequency range associated with the pilot frequency in a licensed ATSC signal or embedding a watermark signal into said ATSC-like white space signals. White space device transmitters generate the signals with these modifications and white space receivers are equipped to detect whether a pilot exists in the standard licensed pilot frequencies. Based on these differences, white space devices can better operate without interfering with licensed ATSC transmission. Additionally, the modification techniques may be used to embed data in the white space signal that may be used to communicate connection data or networking data to other white space devices.

26 Claims, 12 Drawing Sheets

MODIFY A WAVEFORM OF THE ATSC-LIKE WHITESPACE SIGNALS BY SHIFTING THE WHITESPACE SIGNAL TO RESULT IN AN ATSC-LIKE PILOT SIGNAL FREQUENCY OUTSIDE OF AT LEAST ONE FREQUENCY RANGE ASSOCIATED WITH THE ATSC BROADCAST SIGNALS OR EMBEDDING A WATERMARK SIGNAL INTO THE ATSC-LIKE WHITESPACE SIGNALS — 800

TRANSMIT THE MODIFIED WAVEFORM — 801

(56) References Cited

U.S. PATENT DOCUMENTS

| | | | |
|---|---|---|---|
| 2009/0003470 A1* | 1/2009 | Waltho | 375/260 |
| 2009/0013356 A1* | 1/2009 | Doerr et al. | 725/62 |
| 2009/0052588 A1* | 2/2009 | Gao et al. | 375/340 |
| 2009/0102981 A1* | 4/2009 | Mody | 348/732 |
| 2009/0115914 A1* | 5/2009 | Jiang | 348/735 |
| 2009/0286480 A1* | 11/2009 | Cho et al. | 455/62 |

FOREIGN PATENT DOCUMENTS

| | | | | |
|---|---|---|---|---|
| WO | WO2008114216 A2 | 9/2008 | | |
| WO | 2009/011688 A1 | 1/2009 | | |
| WO | WO 2009/011688 A1 * | 1/2009 | | H04L 27/26 |
| WO | 2009/042008 A1 | 4/2009 | | |

\* cited by examiner

DISTINGUISHING AND COMMUNICATING BETWEEN WHITE SPACE DEVICES TRANSMITTING ATSC-COMPATIBLE SIGNALS

TECHNICAL FIELD

The present disclosure relates, in general, to wireless communication systems, and, more particularly, to Advanced Television Systems Committee (ATSC)-compatible white space communications.

BACKGROUND

The Federal Communications Committee (FCC) is an independent agency of the United States government that is charged with regulating all non-federal government use of the radio spectrum (including radio and television (TV) broadcasting), and all interstate telecommunications (wire, satellite and cable) as well as all international communications that originate or terminate in the United States. In 2008, the FCC issued rules approving the unlicensed signal operation in the unused TV channels (i.e., white space). However, this approved, unlicensed use is subject to protections set in place for the primary users of the TV band. The primary users of the TV band are ATSC/National Television System Committee (NTSC) transmitters, such as TV broadcasters, and licensed wireless microphones. The new rules allow wireless technologies to use the TV white space as long as the technology and any resulting signal transmissions do not interfere with the existing primary users. For purposes of this disclosure, the various devices that utilize such technologies to access this TV white space will be referred to as "white space devices," "unlicensed devices," or the like.

One of the technologies proposed for unlicensed use within the white space would enable high-definition (HD) wireless display via an ATSC-compatible signal transmitted over the TV white space. Such technologies are described in commonly-owned, co-pending U.S. patent application Ser. No. 12/547,834, entitled, "Local Broadcast of Data Using Available Channels of a Spectrum," filed Aug. 26, 2009, the disclosure of which is expressly incorporated herein by reference in its entirety. An issue that may develop in such unlicensed transmitters is misdetection of the unlicensed, ATSC-compatible signals as a licensed, primary user. This misdetection could result in preventing other unlicensed devices from reusing that particular white space channel. Because the FCC rules provide for ATSC sensing at −114 dBm, the resulting "black out" area around the misdetected transmission could be quite substantial, leading to a poor frequency reuse pattern and inefficient use of available white space resources. For purposes of this disclosure, a black out area refers to a physical area that the FCC provides around the licensed primary users of the TV band in order to prevent signal interference by the unlicensed transmissions. These problems could become even more severe in areas where there is only limited white space available. In such case, other white space devices might not even find an empty channel in which to operate.

BRIEF SUMMARY

Various embodiments of the present teachings are directed to differentiating white space signals from licensed ATSC signals. The distinguishing characteristics are provided as modifications to the waveform of the white space signals. White space signals may be modified by shifting the ATSC-compatible waveform so that the pilot signal frequency is at a location outside of the frequency range associated with pilot signals in a licensed ATSC signals or embedding a watermark signal into said ATSC-like white space signals. White space device transmitters generate the signals with these modifications and white space receivers are equipped to detect whether a pilot exists in the standard licensed pilot frequencies or not. Based on these differences, white space devices can better operate without interfering with licensed ATSC transmission. Additionally, the modification techniques may be used to embed data in the white space signal that may be used to communicate connection data or networking data to other white space devices.

Representative embodiments of the present disclosure are directed to methods to differentiate an ATSC-like white space signal from a licensed ATSC signal. These methods include modifying a waveform of the ATSC-like white space signal, wherein the modifying can be either shifting the ATSC-like signal so that a frequency of a pilot signal of the ATSC-like signal is shifted outside of at least one frequency range associated with the licensed ATSC signal or embedding a watermark signal into the ATSC-like white space signal. The methods also include transmitting the modified waveform.

Additional representative embodiments of the present teachings are directed to white space devices that include a processor, a modulator/demodulator (modem) coupled to the processor, an ATSC signal detector coupled to the processor, a transceiver coupled to the processor, an antenna array coupled to the transceiver, a memory coupled to the processor, and a white space signal generator module stored in the memory. When executed by the processor, the executing white space signal generator configures the white space device to modify a waveform of white space signals, wherein the modified waveform includes either a pilot signal frequency shifted outside of at least one frequency range associated with a licensed ATSC signals or a watermark signal embedded into the white space signals. The white space device is further configured to transmit the modified waveform over the antenna array.

Further representative embodiments of the present disclosure are directed to computer-readable media that have program code stored thereon. The program code includes code to modify a waveform of a white space signal, wherein the program code to modify comprises either code to shift the white space signal so that a frequency of a pilot signal of the white space signal is shifted outside of at least one frequency range associated with a licensed ATSC signal or code to embed a watermark signal into the white space signal. The program code also includes code to transmit the modified waveform.

Further representative embodiments of the present disclosure are directed to systems to differentiate an ATSC-like white space signal from a licensed ATSC signal. These systems include means for modifying a waveform of the ATSC-like white space signal, wherein the means for modifying comprises either means for shifting the ATSC-like signal so that a frequency of a pilot signal of the ATSC-like signal is shifted outside of at least one frequency range associated with the licensed ATSC signal or means for embedding a watermark signal into the ATSC-like white space signal. The systems also include means for transmitting the modified waveform.

Further representative embodiments of the present disclosure are directed to methods to distinguish between a white space signal and an licensed ATSC signal. These methods include detecting a modified waveform in an ATSC-compatible signal, wherein the modification comprises either a pilot signal frequency outside at least one frequency range associated with the licensed ATSC signal, a watermark signal embedded into the ATSC-compatible signal, wherein the watermark signal is indicative of a white space signal, or at least one quiet period within the ATSC-compatible signal. The methods also include determining the ATSC-compatible signal is a white space signal in response to detecting the modified waveform.

Further representative embodiments of the present disclosure are directed to white space devices that include a processor, a modulator/demodulator (modem) coupled to the processor, an ATSC signal detector coupled to the processor, a transceiver coupled to the processor, an antenna array coupled to the transceiver, a memory coupled to the processor, and a signal analyzer module stored in the memory. When executed by the processor, the executing signal analyzer module configures the white space device to detect a modified waveform in an ATSC-compatible signal, wherein a modification in the modified waveform comprises either a pilot signal frequency outside at least one frequency range associated with a licensed ATSC signal, a watermark signal embedded into the ATSC-compatible signal, wherein the watermark signal is indicative of a white space signal, or at least one quiet period within the ATSC-compatible signal. The white space devices are further configured to determine the ATSC-compatible signal is the white space signal in response to detection of the modified waveform.

Further representative embodiments of the present disclosure are directed to computer-readable media including program code stored thereon. This program code includes code to detect a modified waveform in an ATSC-compatible signal, wherein the modification comprises either a pilot signal frequency outside at least one frequency range associated with a licensed ATSC signal, a watermark signal embedded into the ATSC-compatible signal, wherein the watermark signal is indicative of a white space signal, or at least one quiet period within the ATSC-compatible signal. The program code also includes code, executable in response to detecting the modified waveform, to determine the ATSC-compatible signal is the white space signal.

Further representative embodiments of the present disclosure are directed to systems for distinguishing between a white space signal and a licensed ATSC signal. These systems include means for detecting a modified waveform in an ATSC-compatible signal, wherein the modification comprises either a pilot signal frequency outside at least one frequency range associated with the licensed ATSC signal, a watermark signal embedded into the ATSC-compatible signal, wherein the watermark signal is indicative of the white space signal, or at least one quiet period within the ATSC-compatible signal. The systems also include means, executable in response to detecting the modified waveform, for determining the ATSC-compatible signal is the white space signal.

Further representative embodiments of the present disclosure are directed to methods for establishing communication between at least two white space devices. These methods include receiving a white space signal at a first white space device, detecting modulation of a watermark signal embedded in the white space signal, demodulating the watermark signal into communication data, and establishing communication with a second white space device based on the communication data.

Further representative embodiments of the present disclosure are directed to methods for establishing communication between at least two white space devices. These methods include receiving an ATSC-like white space signal at a first white space device, searching for two tones embedded in the ATSC-like white space signal, detecting an active one of the two tones, decoding the ATSC-like white space signal into a prefix free code based on the detected active one of the two tones, and establishing communication with a second white space device using the prefix free code.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific embodiments disclosed may be readily utilized as a basis for modifying or designing other structures for carrying out the same purposes of the present teachings. It should also be realized by those skilled in the art that such equivalent constructions do not depart from the technology of the teachings as set forth in the appended claims. The novel features which are believed to be characteristic of the teachings, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following description taken in conjunction with the accompanying drawings.

DETAILED DESCRIPTION

Cognitive radios operate a system of wireless communication in which either a network or a wireless node changes its transmission or reception parameters to communicate efficiently while avoiding interference with licensed users also called primary users. However, in the proposed TV white space, the white space devices will be using ATSC-compatible signals, which may be indistinguishable from the other ATSC broadcast signals. For purposes of this disclosure, unlicensed ATSC-compatible signals will be referred to as "white space signals," "unlicensed signals," "ATSC-like signals," and the like. Without the ability to distinguish between compatible signals, not only is the frequency re-use pattern limited, it may be difficult, if not impossible, to establish full network communication between other unlicensed white space devices. Therefore, simple spectrum sensing techniques and other current cognitive network techniques may be inadequate to make as full a use of the TV white space as possible.

Figure 1:
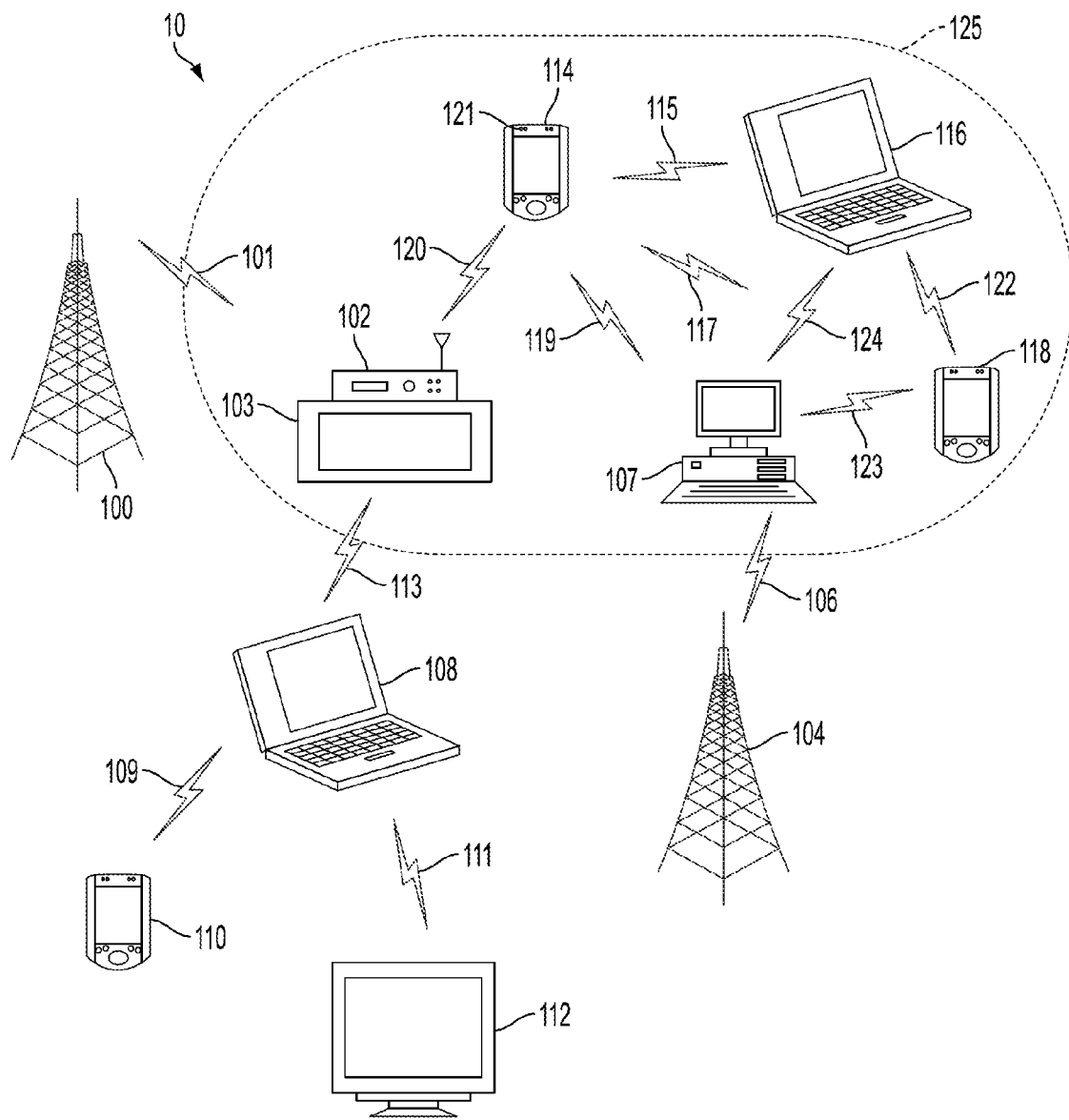
FIG. 1, a block diagram is shown illustrating a TV white space network configured according to one embodiment of the present teachings.

Turning now to FIG. 1, a block diagram is shown illustrating a TV white space network 10 configured according to one embodiment of the present teachings. Licensed ATSC signals originate from primary users, such as TV broadcasters and the like. The TV white space network 10 includes an ATSC transmitter 100 which transmits an ATSC signal 101. Many different devices may use such licensed ATSC signal 101, including a TV tuner 102, which includes a tuner and a signal decoder. The TV tuner 102 receives the licensed ATSC signal 101 and decodes the signals for display onto an associated television 103. Similarly, a licensed ATSC transmitter 104 transmits an ATSC signal 106 to a computer 107 for further processing. Each of the ATSC signals 101 and 106 is a licensed signal protected from interference by FCC regulations of various white space devices. In order to operate such white space devices along side of licensed ATSC signals 101 and 106, embodiments of the present disclosure provide for white space device transmitters to manipulate the white space signals such that white space device receivers may distinguish between licensed ATSC signals and white space signals.

A laptop computer 108 is equipped with an ATSC signal detector and internal wireless antenna which configure the laptop computer 108 for wirelessly transmitting and receiving white space signals. The user of the laptop computer 108 has developed content that he or she intends to share over the TV white space network 10 with other white space or ATSC devices, such as the TV tuner 102 with the television 103, a mobile device 110, and a white space-compatible television 112. The laptop computer 108 begins by sensing the available ATSC spectrum in its vicinity. It detects the ATSC signal 101 and identifies this channel as off-limits for any unlicensed transmissions. The laptop computer 108 then generates white space signals 109, 111, and 113 that includes a characteristic that distinguishes themselves from the ATSC signal 101.

Once the modified ATSC signals have been generated, the laptop computer 108 then transmits these white space signals 109, 111, and 113 to the TV tuner 102, the mobile device 114, and the television 112, respectively, using a white space channel that is currently unused by any licensed transmissions. On the receiving end, each of the TV tuner 102, the mobile device 110, and the television 112, receive the white space signals 109, 111, and 113, respectively, and analyze those signals to determine whether the signals are licensed ATSC signals or white space signals. The TV tuner 102, the mobile device 110, and the television 112 detect that the white space signals 109, 111, and 113 are not licensed ATSC signals and process those signals accordingly. Each of the TV tuner 102, the mobile device 110, and the television 112 will, thereafter, display the content that the user of the laptop computer 108 transmitted.

In addition to the white space communication established between the laptop 108 and the TV tuner 102, the mobile device 110, and the television 112, a white space network 125 may also be established to enable a conference between users at a laptop computer 116, a mobile device 118, a computer 107, and the TV tuner 102 with the television 103. A user of the mobile device 114 desires to enable a video presentation of himself or herself utilizing a camera 121 built into the mobile device 114. When the white space network 125 is ready to be established, the mobile device 114 generates white space signals 115, 117, 119, and 120 that have been modified to be distinguishable from licensed ATSC signals, but in which additional network sensing data has been embedded into the differentiating characteristics. Using this network sensing information, which could include data such as available white space channels, pilot frequency offsets, and the like, each of the laptop computer 116, the mobile device 118, the computer 107, and the TV tuner 102 establish communication with one another using the white space signals 115, 117, 119, 120, and 122-124. On formation of the white space network 125, the user of the mobile device 114 may begin transmitting new white space signals representative of the video presentation. Each time the mobile device 114 transmits such signals, it first monitors the selected channel to determine whether a licensed ATSC signal is present. On the receiving end, each time any of the white space devices, such as the laptop computer 116, the mobile device 118, the computer 107, and the TV tuner 102 receives such a signal, they will analyze the signal to detect whether or not the signals are licensed ATSC signals or white space signals. After determining that the signals received from the mobile device 114 are, in fact, white space signals, the laptop computer 116, the mobile device 118, the computer 107, and the TV tuner 102 will begin processing those white space signals as such.

It should be noted that any variety of information may be communicated between white space devices individually or participating in a white space network. Examples of such information includes sensing information, such as channel availability, location information, signal strength information, white space pilot frequency information, offset information, and the like. Moreover, cooperative sensing may be enabled through sharing of resources between different white space devices within the white space network. For example, with reference to FIG. 1, the laptop 116 may not have the capability to determine location. By leveraging the white space network 125, the laptop 116 may query the other white space devices for such location information. In response, the mobile device 118 may transmit such location information obtained from its GPS receiver using the information embedding techniques described herein. As such, the laptop 116 may benefit from additional information obtained from devices having additional capabilities.

In the embodiment described in FIG. 1, the laptop computer 108 and the mobile device 114 and each of the unlicensed devices generated a distinguishing signal characteristic that allows an ATSC or white space receiver or transmitter to distinguish between a licensed ATSC signal and a white space signal. On the receiving side, this allows the receiver to process the correct signal, and on the transmitting side, this allows the transmitter to select a white space channel that meets the protective requirements against interference with licensed signals, but which may not meet those requirements for the unlicensed signals. The various embodiments of the present teachings may implement this distinguishing signal characteristic in a variety of ways.

In order to distinguish between a white space signal and a licensed ATSC signal transmitted by a primary user, some variations are to be incorporated into the ATSC-compatible signal. However, because ATSC signal detectors will be used in the processing of any ATSC or white space signal, an important constraint on any added signature or variation is not to disturb the performance of that ATSC signal detector.

After the transition in the United States to digital TV (DTV) transmission, there will be two possible pilot frequencies per channel for licensed ATSC broadcast signals: 309440.6 Hz and 328843.6 Hz (both measured from the lower edge of operating channel, and with a precision within 10 Hz at the broadcasting transmitter). In a first method for distinguishing signals, an unlicensed device transmitting a white space signal can, therefore, shift the white space signal such that its pilot signal is shifted to a different frequency location. The pilot in the white space signal actually remains in the same relative location for ATSC signals. However, with the entire signal shifted by a certain frequency, the actual location will be outside of the frequency range excepted by ATSC receivers. Because other white space devices will not detect the pilot in one of the expected locations of a licensed ATSC signal, they may determine the received signal to be an unlicensed ATSC-compatible signals. For example, in one embodiment of the present teachings, a white space device may shift the white space signal in order to provide the pilot signal in the middle of the two standard locations, i.e., at 319 kHz above the lower edge of the operating channel. In other embodiments the white space signal may be shifted, such that the pilot signal may be selected by sweeping across a number of different frequencies within a safe range away from the standard pilot frequencies. In still other embodiments, the white space signal may be shifted, such that the particular pilot frequency is varied with time between a certain set of safe pilot frequencies. Erroneous detection may still occur if a poor quality local oscillator (LO) is used, particularly if the local oscillator drift is high enough that the pilot might drift back closer to one of the two standard ATSC pilot locations. However, in order to avoid this potential, the unlicensed device manufacturer may add LO calibration or a higher-quality, low drift LO.

Figure 2:
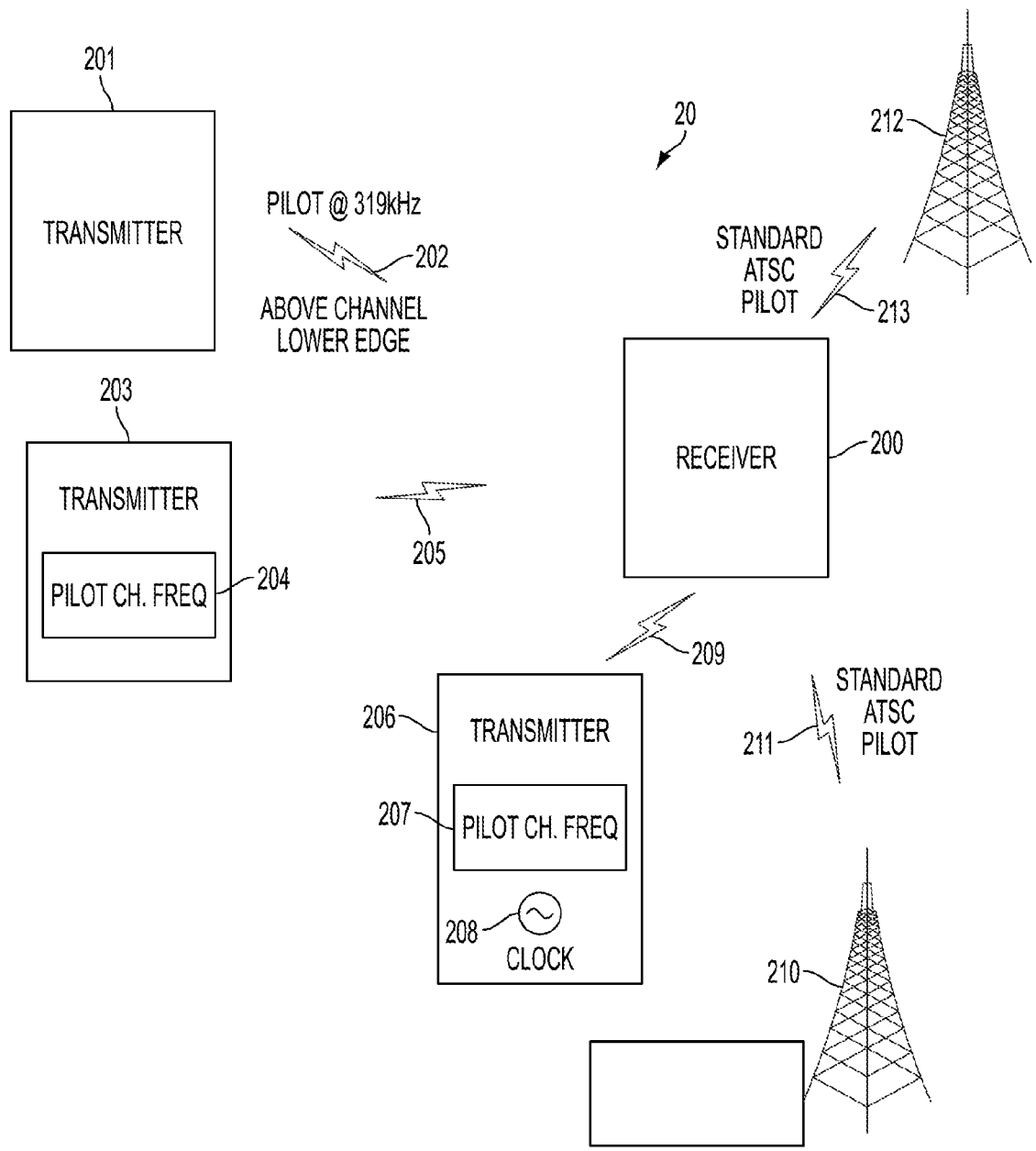
FIG. 2 is a block diagram illustrating a white space network configured according to one embodiment of the present teachings.

FIG. 2 is a block diagram illustrating a white space network 20 configured according to one embodiment of the present teachings. A receiver 200 within the white space network 20 receives multiple ATSC and ATSC-like signals (i.e., ATSC-like signals 202, 205, and 209, and ATSC signals 211 and 213). In order to distinguish between the ATSC and ATSC-like signals, the receiver 200 examines the location of the pilot in each signal.

In transmitting the ATSC-like signal 202, a transmitter 201 generates the ATSC-like signal 202 shifted in frequency, such that the pilot signal of the ATSC-like signal 202 is located in the middle frequency between the two possible standard ATSC pilot frequencies. For purposes of the embodiment described in FIG. 2, the middle frequency is located at 319 kHz measured from the lower edge of the operating channel. Thus, as the ATSC-like signal 202 is received at the receiver 200, the receiver 200 checks the standard frequency locations for an ATSC pilot signal. Because the ATSC-like signal 202 is not a licensed signal, the receiver will not find a pilot at the standard locations. As such, the receiver 200 identifies the ATSC-like signal 202 as an unlicensed signal and designates it for processing accordingly.

In transmitting the ATSC-like signal 205, a transmitter 203 selects to shift the frequency of the ATSC-like signal 205, so that its pilot signal is selected according to a set of pilot channel frequencies 204. The set of pilot channel frequencies 204 is a predetermined number of different frequencies or a predetermined amount of frequency shift for the ATSC-like signal 205 to create a pilot signal that falls within a safe window outside of the standard pilot frequencies for licensed ATSC signals. The transmitter 203 sweeps sequentially through the set of pilot channel frequencies 204 selecting the resulting pilot signals for each of its unlicensed signals, such as the ATSC-like signal 205. Again, at the receiver 200, it searches the standard frequency locations for the pilot, and, when a pilot is not found at such locations, it identifies the ATSC-like signal 205 as an unlicensed signal and designates it for processing accordingly.

It should be noted that in various additional embodiments of the present teachings, the transmitter 203 may use any method for selecting which of the set of frequencies to choose for the pilot. For example, the transmitter 203 may randomly select the frequency, select the frequency according to a particular hashing scheme, or the like. The various embodiments of the present teachings are not limited to one specific way to select between the set of available pilot frequencies.

A transmitter 206 operates similarly to the transmitter 203. However, instead of sweeping through the set of pilot channel frequencies 207, the selection of particular frequencies among the set of pilot channel frequencies 207 is varied according to time provided by a clock component 208. The receiver 200 searches the standard frequency locations for the pilot, and, when a pilot is not found at such locations, it identifies the ATSC-like signal 209 as an unlicensed signal and designates it for processing accordingly.

The receiver 200 also receives the ATSC signals 211 and 213 from the licensed transmitters 210 and 212, respectively. In analyzing these signals, the receiver 200 locates the pilot signals at a standard frequency location. Accordingly, the receiver 200 designates the ATSC signals 211 and 213 as licensed signals and identifies them for processing according to other licensed ATSC signals.

It should be noted that, in selecting the frequency location of the pilot, care should be used in selecting a frequency that will not affect the acquisition/tracking capability of any frequency and phase locked loop (FPLL) present in the TV tuner.

Figure 3A:
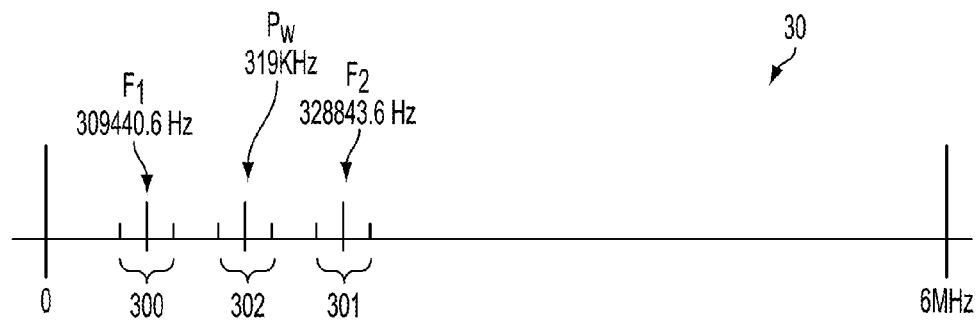
FIG. 3A is a timeline representing a single ATSC channel configured according to one embodiment of the present teachings.

FIG. 3A is a frequency graph representing a single ATSC channel 30 configured according to one embodiment of the present teachings. A standard ATSC channel, such as ATSC channel 30, has a bandwidth of 6 MHz. The pilot for licensed ATSC channels may be at one of two frequencies within the channel. Measuring from the lower edge of the ATSC channel 30 (i.e., at 0 MHz), the licensed ATSC pilot may be at 309440.6 Hz, $F_1$, or 328843.6 Hz, $F_2$. When searching to detect whether a particular ATSC signal is a licensed signal or not, a compatible receiving device will look for a pilot signal at each of the pilot frequencies, $F_1$ and $F_2$. Accounting for noise or inaccuracy of the oscillators of particular receivers, the ATSC detector in the white space receiver accounts for a window around each of the pilot frequencies, $F_1$ and $F_2$, in which such a pilot signal may be detected. The precision windows 300 and 301, therefore, define the allowable bandwidth within which the licensed pilot signals may be found in the ATSC channel 30.

When no pilot signals are found at either of the pilot frequencies, $F_1$ and $F_2$, the receiver determines that this signal is an ATSC-like signal. As noted with regard to FIG. 2, the transmitter 201 generates its ATSC-like signal having a pilot signal at a center frequency of 319 KHz. This ATSC-like pilot signal, $P_W$, is, therefore, located between standard pilot frequencies, $F_1$ and $F_2$, and outside of the precision windows, $F_1$ and $F_2$, by a large enough margin, such that any drift caused by inaccurate oscillators will not cause the ATSC-like pilot signal, $P_W$, to drift into one of the precision windows 300 and 301. The ATSC-like pilot signal, $P_W$, also maintains a precision window 302 around it for the same reasons as precision windows 300 and 301. Thus, as the receiver fails to find pilot signals at the standard pilot frequencies, $F_1$ and $F_2$, it finds the ATSC-like pilot signal, $P_W$, verifying this ATSC-channel 30 is an ATSC-compatible signal connected with the unlicensed use of the ATSC white space.

Figure 3B:
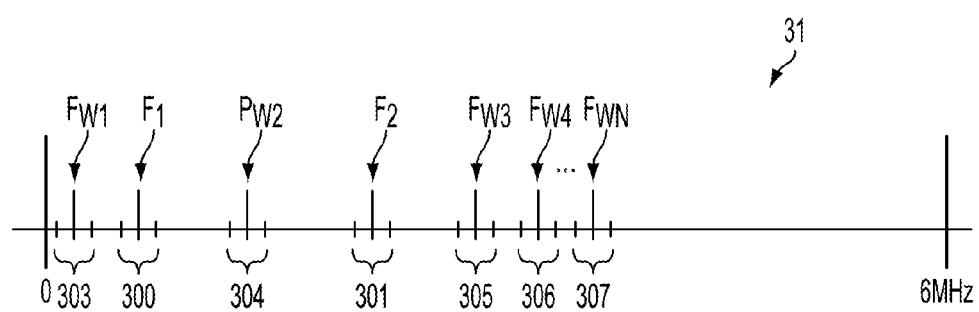
FIG. 3B is a timeline representing a single ATSC channel configured according to one embodiment of the present teachings.

FIG. 3B is a frequency graph representing a single ATSC channel 31 configured according to one embodiment of the present teachings. Because there may be many different white space devices operating in a given area, the ATSC channel 31 provides for multiple pilot frequencies, $F_{W1}$-$F_{WN}$, where 'N' represents the total number of such pilot frequencies. A given white space device may shifts its white space signals to place the pilot signal in any of these pilot signal frequencies, $F_{W1}$-$F_{WN}$, at any given time, if such frequency is available. Each of the pilot signal frequencies, $F_{W1}$-$F_{WN}$, is located in a window or windows outside of the standard pilot frequencies, $F_1$ and $F_2$, such that none of the pilot signal frequencies, $F_{W1}$-$F_{WN}$, will fall within a certain frequency range of the standard pilot frequencies, $F_1$ and $F_2$.

The pilot signal frequencies $F_{W1}$-$F_{WN}$ may be selected using a number of different methods. For example, with reference again to FIG. 2, the transmitter 203 selects the shift of the white space signal to sequentially sweep through the set of pilot frequencies, $F_{W1}$-$F_{WN}$, when assigning frequencies for the pilot signal of an ATSC-like signal. Thus, in a first ATSC-like signal being formed by the transmitter 203 (FIG. 2), the transmitter shifts the ATSC-like signal 205 to select pilot frequency, $F_{W1}$, to place the ATSC-like pilot. A next ATSC-like signal being formed by the transmitter 203 (FIG. 2) uses the selected pilot frequency, $F_{W2}$, for its pilot, and so forth. Once all of the possible frequencies in the set of pilot signal frequencies, $F_{W1}$-$F_{WN}$, the transmitter 203 (FIG. 2) will begin selecting signal shifts to result in the frequencies at the beginning of the list. By this time, in forming such ATSC-like signals, the use of the earlier pilot frequencies will likely not interfere with other ATSC-like signal pilots.

As described with respect to FIG. 2, the alternative methods for selecting from the set of pilot signal frequencies, $F_{W1}$-$F_{WN}$, such as random selection, and selection according to a hashing algorithm, may also be accomplished. Furthermore, the transmitter 206 may shift the ATSC-like signal 209 to select one of the pilot signal frequencies, $F_{W1}$-$F_{WN}$, according to the particular timing scheme generated by its clock component 208. Thus, the various different methods to shift the ATSC-like signals to select a particular pilot frequency may provide signals that are differentiable from licensed ATSC signals.

Figure 4A:
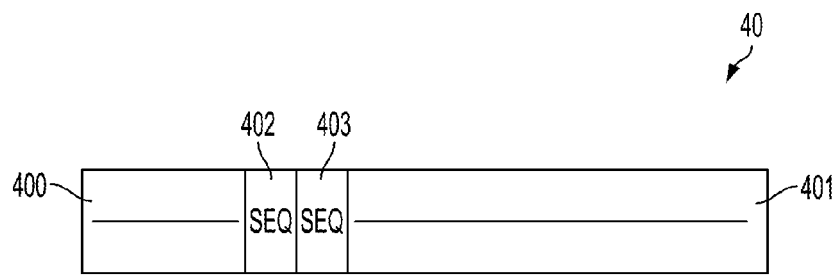
FIG. 4A is a block diagram illustrating an ATSC-compatible signal configured according to one embodiment of the present teachings.

A second method for distinguishing between signals is by embedding a watermark into the ATSC-compatible signal. As used herein, a watermark is a digital signal embedded into an ATSC-compatible signal which, while it does not affect the content of the data transmitted, may be detected by a receiving device in order to distinguish between the two types of signals. For example, an unlicensed device may embed a known sequence, such as a pseudonoise (PN) sequence or a Hadamard code, into the ATSC-compatible signal. FIG. 4A is a block diagram illustrating an ATSC-compatible signal 40 configured according to one embodiment of the present teachings. The ATSC-compatible signal 40 includes the ATSC payload 400 and 401, which includes the specific ASTC-like pilot, the data, and other information items typically included in an ATSC-compatible signal. In addition, the ATSC-compatible signal 40 includes a watermark made up of sequences 402 and 403. The sequences 402 and 403 may, as noted, comprise a PN sequence, a Hadamard code, or the like. On receipt of the ATSC-compatible signal 40, the receiver will detect sequences 402 and 403 and be able to use this sequence to differentiate from a licensed ATSC signal.

Figure 4B:
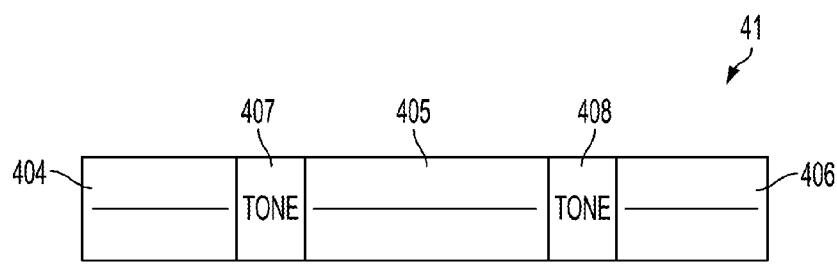
FIG. 4B is a block diagram illustrating an ATSC-compatible signal configured according to one embodiment of the present teachings.

In other embodiments, an unlicensed device may add one or more additional single tone pilots at different locations as a watermark. FIG. 4B is a block diagram illustrating an ATSC-compatible signal 41 configured according to one embodiment of the present teachings. The ATSC-compatible signal 41 includes the ATSC payloads 404-406 but also includes pilot tones 407 and 408. These pilot tones 407 and 408 act as the distinguishing watermark of the ATSC-compatible signal 41. Again, the receiving device detects the additional tone pilots 407 and 409 and identifies the signal as an unlicensed ATSC-compatible signal.

It should be noted that, when embedding a watermark, the power of the watermark should be low enough not to interfere with the carried ATSC-compatible signal. This is because, from the TV tuner point of view, a watermark signal will potentially interfere with the underlying signal of the received signal.

A third method for distinguishing between ATSC signals is to detect quiet periods in unlicensed transmitters. In order to meet the FCC requirements of sensing primary licensed ATSC signal users at very low signal-to-noise values, an unlicensed white space device will quiet the transmitter during sensing operation. Otherwise, the base level of noise created by an operational transmitter may exceed the threshold signal-to-noise value at which the regulations require sensing the licensed signals from primary users.

Figure 5:
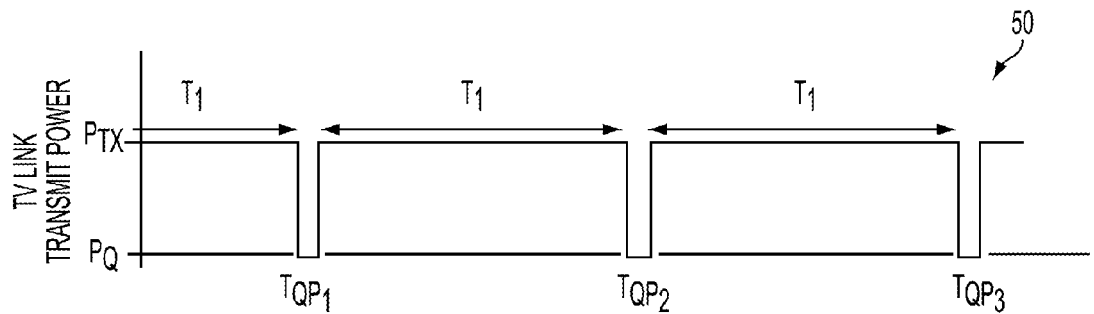
FIG. 5 is a graph of the transmission power for a white space device transmitter configured according to one embodiment of the present teachings.

FIG. 5 is a graph of the transmission power for a white space device transmitter configured according to one embodiment of the present teachings. In its transmission state, the white space device transmitter transmits its signal at a power, $P_{TX}$. At regular intervals, $T_1$, the white space device transmitter quiets its transmitting circuitry reducing the power to the quiet time power, $P_Q$. Thus, as illustrated in FIG. 5, the ATSC-like signal transmitted will have a signature reflecting quiet times $T_{QP1}$-$T_{QP3}$, at the periodic rate of $T_1$.

Detecting such quiet times may be accomplished in a number of different ways. In certain embodiments of such receivers, having the devices synchronized allows for easier detection, although detection without synchronization is also possible. When synchronized, each devices knows the periodic rate for the quiet times. Thus, at start up time, the receiver device will sense for the ATSC signal to drop at a particular time and at a known rate. These white space devices may be synchronized through various different means. For example, each white space device may be equipped with a global positioning satellite (GPS) clock, or a clock based on a particular wireless telecommunication system. Because synchronization would rely only on a common clock, and not necessarily an accurate real-time clock, a clock signal may be taken from a licensed ATSC signal or other wireless signal that has a time reference attached. The various embodiments of the present teachings are not limited to any one particular method for obtaining synchronization nor are such various embodiments limited to even using synchronization. For example, a receiver device detecting a quiet time every 100 ms, for instance, 10 times in a row will determine that the signal is a white space signal and not a licensed ATSC signal.

Figure 6:
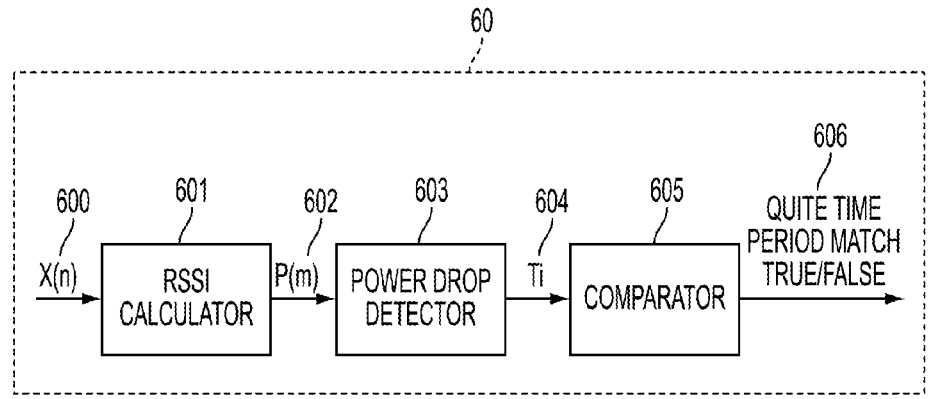
FIG. 6 is a block diagram illustrating a white space device receiver configured according to one embodiment of the present teachings.

Additional embodiments of the present teachings may be implemented in receivers involving white space devices that are either with or without synchronization. When an ATSC signal is sensed, if the signal power is substantially stronger than the noise floor (e.g., greater than or equal to 10 dB stronger), the white space device receiver can process the signal power directly. FIG. 6 is a block diagram illustrating a white space device receiver 60 configured according to one embodiment of the present teachings. The illustrated section of the white space device receiver 60 reflects the quiet time detection process used by the receiver 60. The ATSC signal X(n) 600 is input into a signal strength detector, such as received signal strength indicator (RSSI) calculator 601. The ATSC signal X(n) 600 is the baseband signal of the particular ATSC channel of interest. In processing the ATSC signal X(n) 600, the RSSI calculator 601 takes a series of power measurements of the ATSC signal X(n) 600 and a slower rate than the signal itself. The RSSI calculator 601 outputs that sequence of power measurements P(m) 602, where the rate 'm' is slower than the rate 'n' of the ATSC signal X(n) 600. The sequence of power measurements P(m) 602 is input into a power drop detector 603, which analyzes the sequence of power measurements P(m) 602 for the measurements when the power drops below a particular threshold value. The power drop detector 603 outputs a sequence of times $T_i$ 604 for which the power measurement was below the threshold value. This sequence of times $T_i$ 604 is then analyzed by a comparator 605, which compares the sequence of times $T_i$ 604 against the known quiet time regular intervals, $T_1$. If the sequence of times $T_i$ 604 matches within a certain error window range, then a quiet time detection signal 606 is output indicating whether or not the ATSC signal X(n) 600 is a licensed ATSC signal or an unlicensed ATSC-like signal. The error window may comprise a small mismatch in the sequence of times being compared. While exact matching is not necessary, the error window may be selected to have only a small mismatch.

Figure 7:
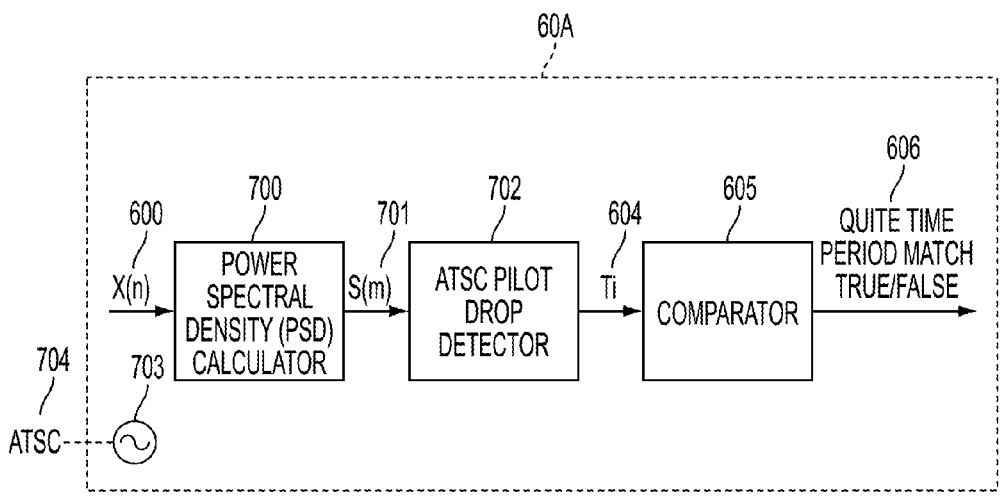
FIG. 7 is a block diagram illustrating a white space device receiver configured according to one embodiment of the present teachings.

If the ATSC signal X(n) 600 is first measured to have a weaker signal strength, the white space device receiver 60 can still detect the quiet times. FIG. 7 is a block diagram illustrating a white space device receiver 60a configured according to one embodiment of the present teachings. The white space device receiver 60a is a slight variation of the white space device receiver 60, as illustrated in FIG. 6. The white space device receiver 60a includes a synchronizing clock 703. The synchronizing clock 703 allows for the white space devices to be synchronized, thus, making it easier for the receiving devices to detect quiet times. As illustrated in FIG. 7, the synchronizing clock 703 may be an accurate real-time clock or it may be driven by a known signal, licensed ATSC signal 704, which has a time stamp or indicator that may be used to establish a common relative clock between the devices.

When the signal power of the ATSC signal X(n) 600 is too close to the noise floor, the signal is converted into the frequency domain by a power spectral density (PSD) calculator 700. The PSD calculator 700 converts the ATSC signal X(n) 600 into its frequency domain component using any number of known methods, including taking the discrete Fourier transform (DFT), a fast Fourier transform (FFT), or the like. The PSD S(m) 701 will be calculated from the ATSC signal X(n) 600 every 'm' samples of the signal and transmitted to an ATSC pilot drop detector 702. The ATSC pilot drop detector 702 outputs a sequence of times $T_i$ 604 during which the ATSC pilot drop detector 702 detects the power of the PDS S(m) 701 dropping below a threshold level. As in the example described and illustrated in FIG. 6, the sequence of times $T_i$ 604 is compared in a comparator 605 to the known quiet time regular interval, $T_1$. If the sequence of times $T_i$ 604 matches within a certain range, then a quiet time detection signal 606 is output indicating whether or not the ATSC signal X(n) 600 is a licensed ATSC signal or an unlicensed ATSC-like signal.

Figure 8:
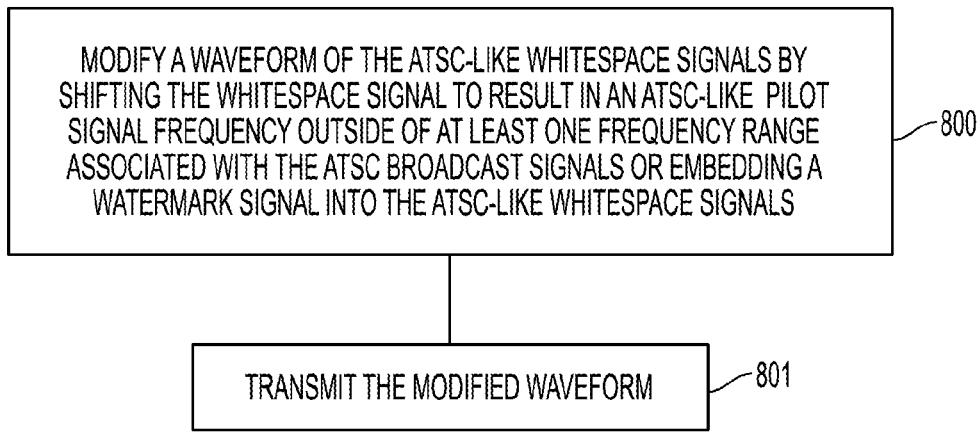
FIG. 8 is a functional block diagram illustrating example blocks executed to implement one embodiment of the present teachings.

In the general operation of selected embodiments of the present teachings, white space device transmitters modify the ATSC-compatible signal. FIG. 8 is a functional block diagram illustrating example blocks executed to implement one embodiment of the present teachings. In block 800, a waveform of the ATSC-like white space signals is modified by shifting the white space signal to result in an ATSC-like pilot frequency outside of at least one frequency range associated with the ATSC broadcast signals or embedding a watermark signal into the ATSC-like white space signals. This modified waveform is then transmitted to another white space device, in block 801.

Figure 9:
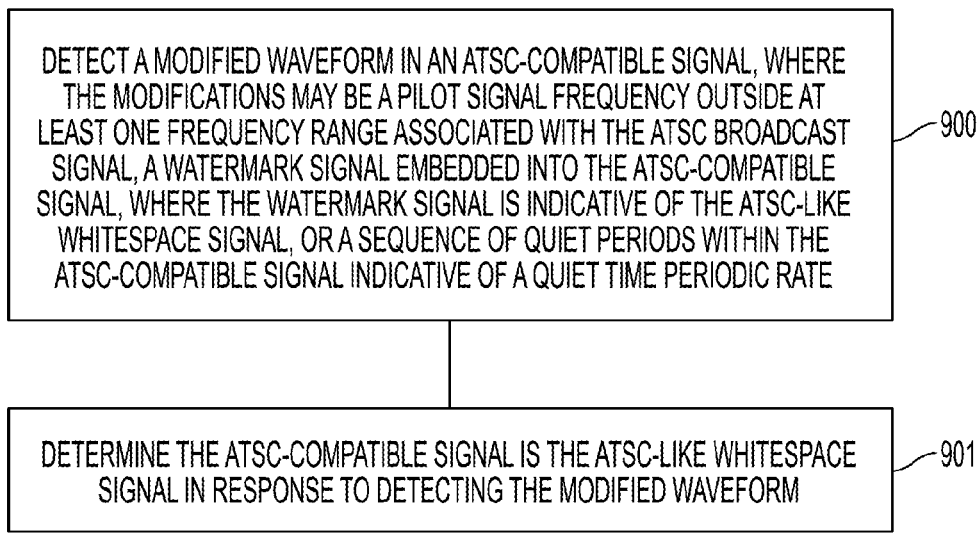
FIG. 9 is a functional block diagram illustrating example blocks executed to implement one embodiment of the present teachings.

On the receiving end of the white space systems, the white space device receivers analyze the received ATSC signals to determine if the signal is a licensed ATSC signal or an unlicensed white space signal. FIG. 9 is a functional block diagram illustrating example blocks executed to implement one embodiment of the present teachings. In block 900, modifications in the waveform of an ATSC-compatible signal are detected, where the modifications may be a pilot signal frequency outside at least one frequency range associated with the ATSC broadcast signal, a watermark signal embedded into the ATSC-compatible signal, where the watermark signal is indicative of the ATSC-like white space signal, or a sequence of quiet periods within the ATSC-compatible signal indicative of a quiet time periodic rate. In response to detecting the modification, the white space device receiver determines, in block 901, that the received signal is an ATSC-like white space signal.

Referring back to FIG. 1, in establishing the TV white space network 10, each of the white space devices is capable of manipulating the ATSC-compatible signal further to add information that can be communicated among the devices. Several different techniques may be used in the various embodiments of the present teachings to transmit such additional information. For example, when a watermark is used by the white space device to distinguish the ATSC-like signal, the device may modulate the watermark at a low rate in order to transmit the data. Modulating at a low rate is selected to reduce the potential interference that the watermark may have on the ATSC-like signal itself. In still another method for incorporating data into the ATSC-like signal, the pilot location may be swept at a low rate in order to avoid impact on FPLL performance. The information is embedded in the particular sweeping sequence of the pilot location. Again, the pilot would be swept within a safe window that does not overlap or interfere with the standard ATSC pilot locations. In order to implement this technique, some embodiments will calibrate the local oscillator drift at both the transmitter and receiver in order to accommodate for inaccurate or imprecise local oscillators.

Figure 10:
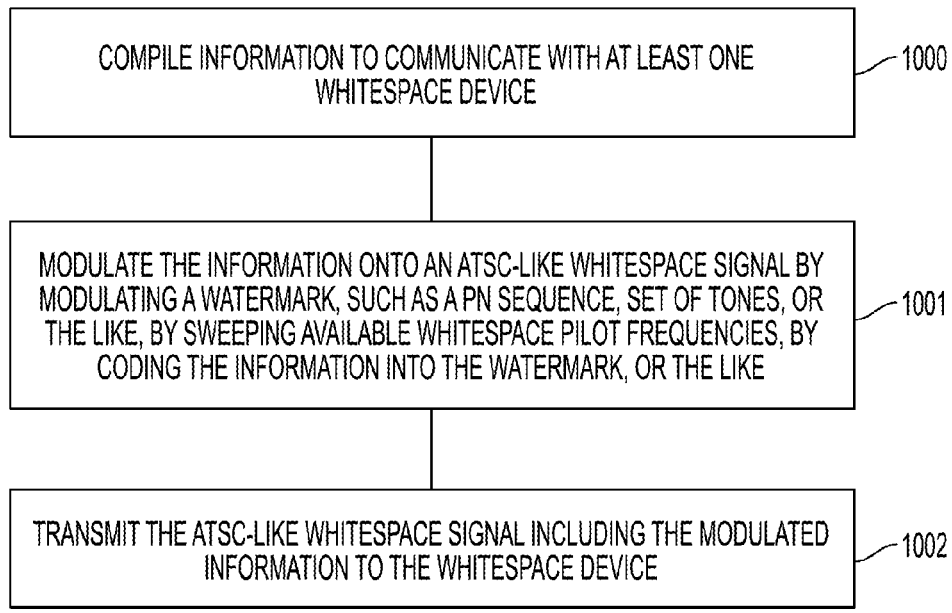
FIG. 10 is a functional block diagram illustrating example blocks executed to implement one embodiment of the present teachings.

FIG. 10 is a functional block diagram illustrating example blocks executed to implement one embodiment of the present teachings. In block 1000, the white space device transmitter compiles information to communicate with at least one other white space device. The white space device transmitter then modulates the information onto an ATSC-like white space signal, in block 1001, by such actions as modulating a watermark, such as a PN sequence, set of tones, or the like, by sweeping available white space pilot frequencies, by coding the information into the watermark, or the like. The white space device transmitter then transmits the ATSC-like white space signal including the modulated information to the white space device in block 1002.

Figure 11:
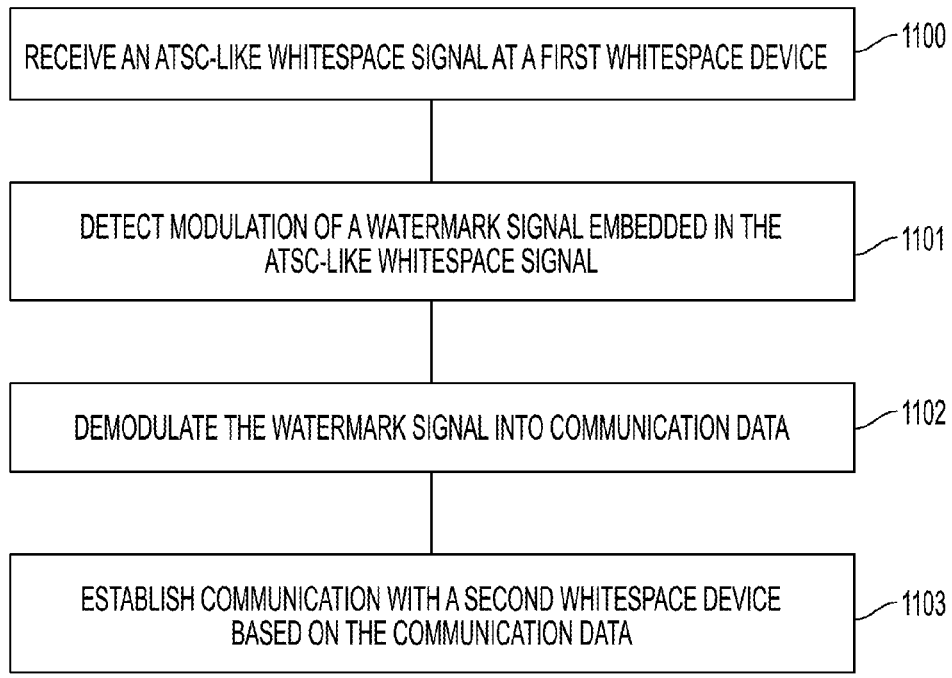
FIG. 11 is a functional block diagram illustrating example blocks executed to implement one embodiment of the present teachings.

On the receiver end, the white space device receiver not only uses its detection methods for differentiating the ATSC-like white space signal from a licensed ATSC signal, it also reads the data embedded into the distinguishing characteristics. FIG. 11 is a functional block diagram illustrating example blocks executed to implement one embodiment of the present teachings. In bock 1100, the white space device receiver receives an ATSC-like white space signal at a first white space device. The white space device receiver then detects the modulation of a watermark signal embedded in the ATSC-like white space signal in block 1101. The white space device receiver demodulates the watermark signal into communication data in block 1102, and then establishes communication, in block 1103, with at least another white space device based on the demodulated communication data.

Figure 12:
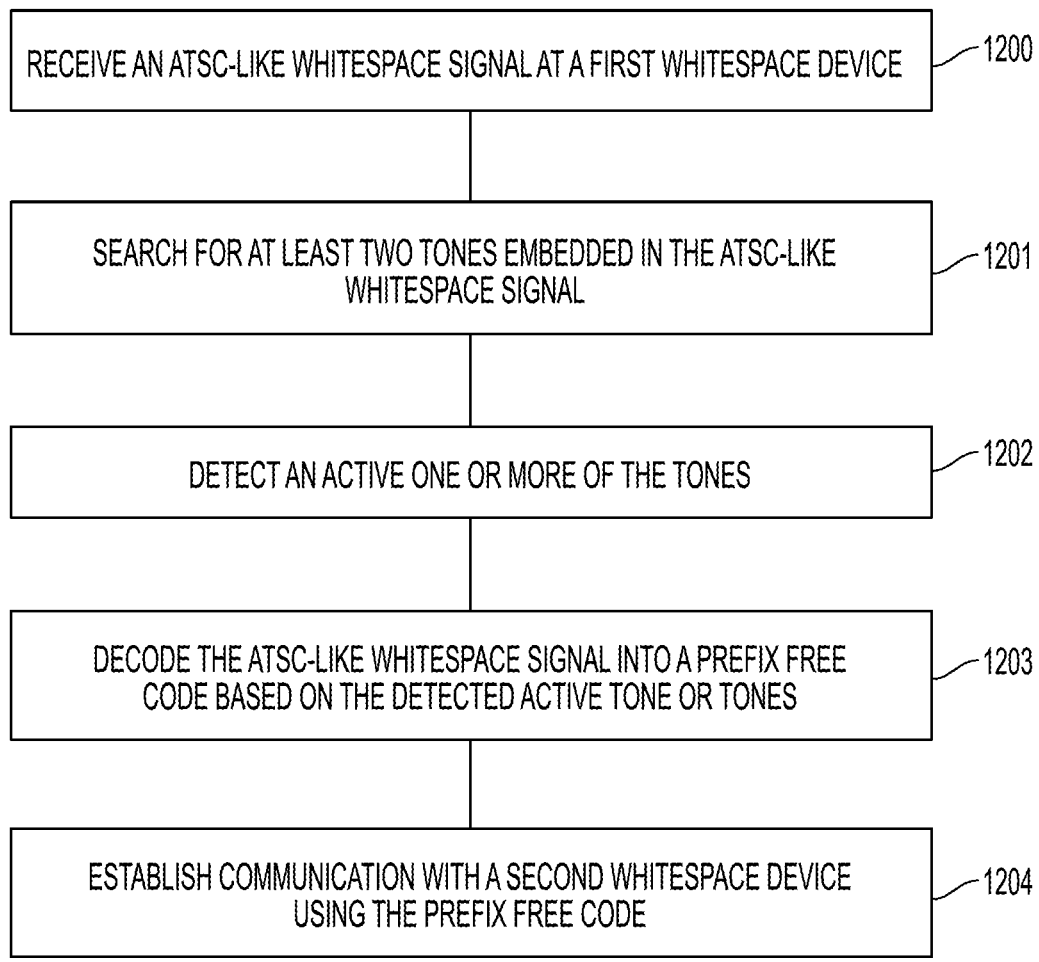
FIG. 12 is a functional block diagram illustrating example blocks executed to implement one embodiment of the present teachings.

It should be noted that in embodiments in which the watermark is a PN sequence, spread spectrum transmission and reception techniques may be used to increase the signal efficiency. In a similar manner, when the watermark is a set of embedded tones, the configuration of the tones may be used to transmit the information by selectively setting the tones on and off to create particular signals or codes. FIG. 12 is a functional block diagram illustrating example blocks executed to implement one embodiment of the present teachings. In block 1200, the white space device receiver receives an ATSC-like white space signal at a first white space device. The white space device receiver searches, in block 1201, for at least two tones embedded in the ATSC-like white space signal during each time interval. An active one or more of the tones is detected in block 1202, after which the white space device receiver decodes the ATSC-like white space signal, in block 1203, into a prefix free code based on the detected active tone or tones. In block 1204, the white space device receiver establishes communication with at least another white space device using the prefix free code. In order to ensure that the switching time does not severely impact the receiver, a code is selected such that the decoding time will be much less than the time interval, T. For example, in some embodiments, majority decoding may be used to eliminate the effects of switching. In each instance of such two-tone coding, each data value is a prefix free code that can be decoded uniquely irrespective of receiver timing.

Figure 13:
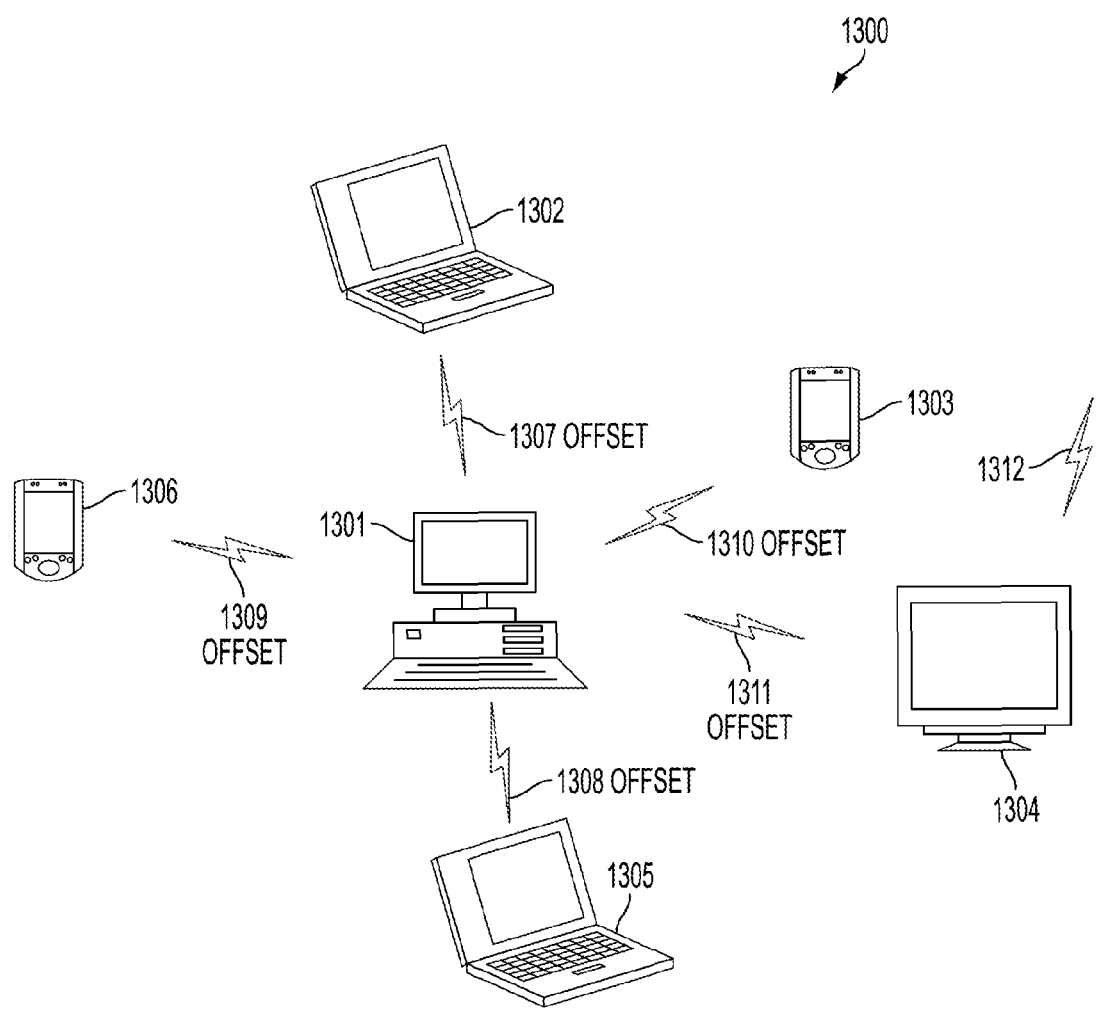
FIG. 13 is a block diagram illustrating a white space device network configured according to one embodiment of the present teachings.

In addition to simple communications and information that may be passed between various white space devices, networks may be established which leverage the techniques for differentiating from licensed ATSC signals and for embedding information into the white space signals. FIG. 13 is a block diagram illustrating a white space device network 1300 configured according to one embodiment of the present teachings. The white space device network 1300 begins with a computer 1301, laptop computer 1302, mobile device 1303, and white space-compatible television 1304. Communications between the devices on the white space device network 1300 use white space signals 1307, 1310, and 1311. Techniques, as described previously, avoid and distinguish between licensed ATSC signals, such as the licensed ATSC signal 1312. Each of the devices that transmit a white space signal to the television 1304 modifies the white space signal using one of the previously described methods. Moreover, the television 1304 is able to receive both the licensed ATSC signal 1312 and the white space signal 1311 and differentiate between them.

Instead of merely exchanging data between the devices, the white space device network 1300 uses multiple signatures in order to use more limited ATSC channels and to establish an active network. The computer 1301 acts as the central system manager for the white space device network 1300. The computer 1301 maintains a list of available channels, a list of the best channels available, as well as a list of PN offsets that may be assigned to different members of the white space device network 1300, or even to different network members of a particular type. The PN offsets provide that the network devices use pilot frequencies offset from one another enough such that each device is distinguishable from the other and each device uses a pilot frequency far enough from the standard pilot frequencies so as not to be in danger of overlapping into the standard pilot frequencies. As the laptop 1305 powers up and requests to join the white space device network 1300, the computer 1301 transmits a particular PN offset for the laptop 1305 to use in establishing its communication link 1308. For purposes of the example described with respect to FIG. 13, the laptops 1302 and 1305 are classified as computer type white space devices. The computer 1301 maintains a network list that identifies particular subsets of available white space pilot frequencies for computer type devices and also an algorithm for calculating offsets to assign when multiple computer types are assigned to the same white space channel. Thus, the PN offset that the laptop 1305 will use in its communication link 1308 will be offset from that used by the laptop 1302, but both will be located on the same channel when available. Similarly, as the mobile device 1306 requests to join the white space device network 1300, the computer 1301 assigns it a particular PN offset that is related to other mobile device types, such as that of the mobile device 1303.

It should be noted that in additional embodiments of the present teachings, instead of maintaining an algorithm for calculating offsets, the computer 1301 may maintain a list of available offsets for particular network devices and/or particular types of network devices. The various embodiments of the present teachings are not limited to any single particular way to maintain such signature information.

Figure 14:
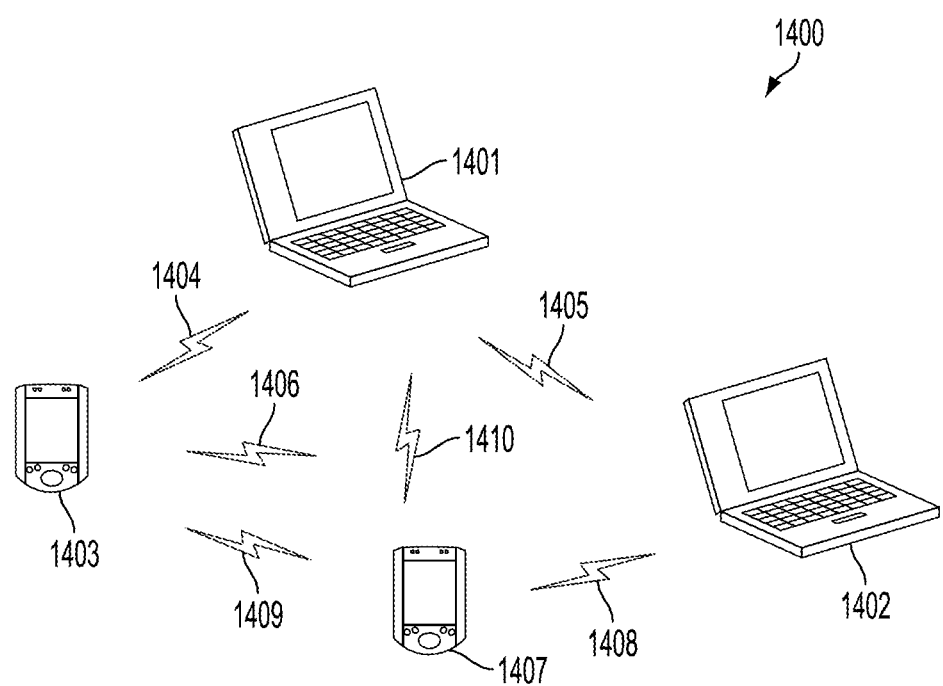
FIG. 14 is a block diagram illustrating a white space device network configured according to one embodiment of the present teachings.

FIG. 14 is a block diagram illustrating a white space device network 1400 configured according to one embodiment of the present teachings. Unlike the white space device network 1300 (FIG. 13), which was managed by a central device, the computer 1301 (FIG. 13), the white space device network 1400 is self-managed by the various devices belonging to the network. The white space device network 1400 begins with laptop computers 1401 and 1402 and mobile device 1403.

The network communications between these devices occur over communication links 1404-1406. These communication links 1404-1406 provide that each of the laptop computers 1401 and 1402 and mobile device 1403 use pilots offset from one another such that each device is distinguishable from the other and each device uses a pilot frequency that is far enough from the standard pilot frequencies so as not to be in danger of overlapping into the standard pilot frequencies.

As a mobile device 1407 senses the white space device network 1400, it determines that it is to join the network. The mobile device 1407 analyzes the pilot frequencies and PN offsets being used by the laptop computers 1401 and 1402 and by the other mobile device 1403. Based on the relationship between those devices, the mobile device 1407 may select its own PN offset that will correspond to the signature reflected of the white space device network 1400. Moreover, the mobile device 1407 may communicate directly with the other devices making up the white space device network 1400 to find out sensing or connection information, such as which channels may be currently unused, or which are the strongest channels, and the like. Therefore, when operating to join the white space device network 1400, the mobile device 1407 will begin using a more favorable channel.

Figure 15A:
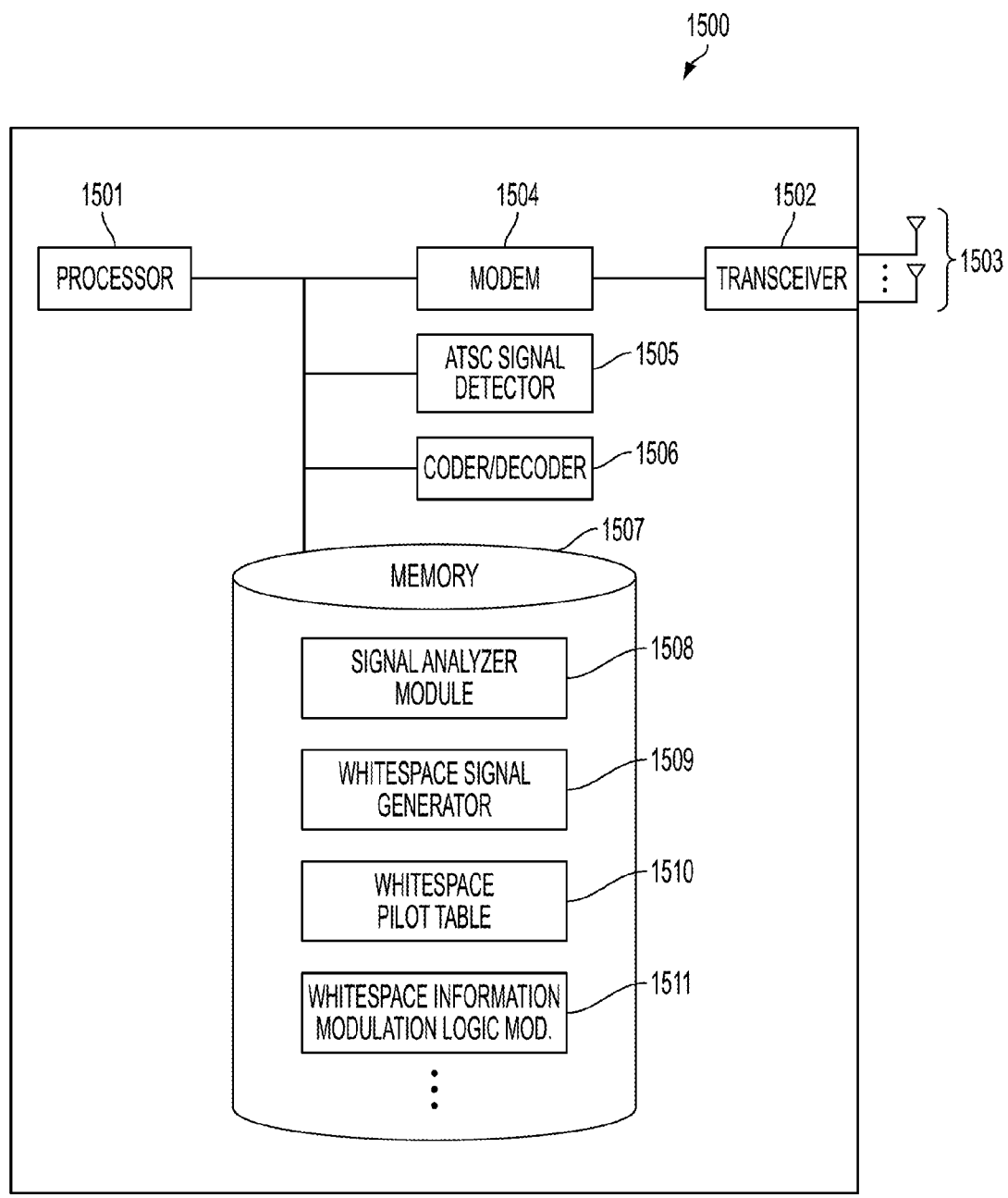
FIG. 15A is a block diagram illustrating a white space device configured according to one embodiment of the present teachings.

Turning now to FIG. 15A, a block diagram is shown illustrating a white space device 1500 configured according to one embodiment of the present teachings. The white space device 1500, which may both receive and transmit white space signals, includes a processor 1501 capable of processing and executing the various features and functionalities of the white space device 1500. It also includes a transceiver 1502 coupled to an antenna array 1503 configured to transmit and receive radio frequency (RF) signals at least within the frequency range of ATSC and white space signals. The white space device 1500 also includes a modulator/demodulator (modem) 1504, an ATSC signal detector 1505 configured to detect signals in the ATSC frequency range, and a coder/decoder (codec) 1506 configured to decode any signals for presentation of the information contained therein. The white space device 1500 also includes memory 1507 configured to store various software modules and data used in operation of the white space device 1500. A signal analyzer module 1508 is stored on the memory 1507. When executed by the processor 1501, the executing signal analyzer module 1508 works in conjunction with the ATSC signal detector 1505 to identify and distinguish between licensed ATSC signals and white space signals. A white space signal generator 1509 is also stored on the memory 1507. When executed by the processor 1501, the executing white space signal generator 1509 works in conjunction with the modem 1504 to generate white space signals for transmission. The executing white space signal generator 1509 uses a white space pilot table to select the appropriate pilot frequency for placing the white space pilot in the generated signal. A white space information modulation logic module 1511 is also stored on the memory 1507. When executed by the processor 1501, the executing white space information modulation logic module works in conjunction with the white space signal generator 1509 to embed any desired communication information within the white space signal through manipulation of the white space signal distinguishing characteristics and also works in conjunction with the modem 1504 to demodulate or detect communication information that has been embedded into received white space signals.

Figure 15B:
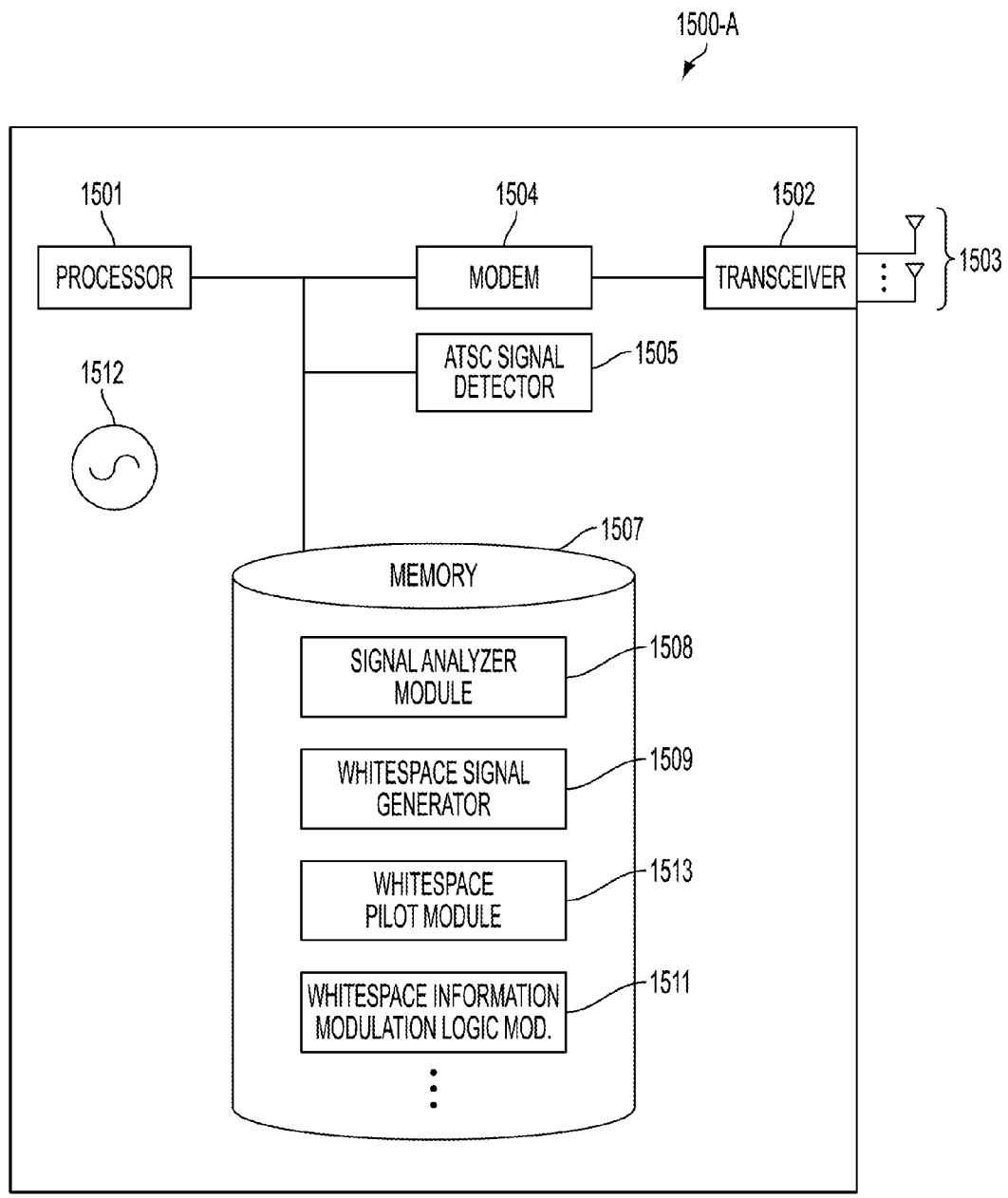
FIG. 15B is a block diagram illustrating a white space device configured according to an alternative embodiment of the present teachings.

FIG. 15B is a block diagram illustrating a white space device 1500-A configured according to one embodiment of the present teachings. The white space device 1500-A includes much of the components as the white space device 1500 (FIG. 15A), such as the processor 1501, transceiver 1502, antenna array 1503, modem 1504, ATSC signal detector 1505, and memory 1507 storing a signal analyzer module 1508, a white space signal generator 1509, and a white space information modulation logic module 1511. In this alternative embodiment of the white space device 1500-A, the device also includes a clock 1512 which is configured and used to synchronize the devices participating in a white space network. The clock 1512 may comprise an accurate real time clock, such as a GPS clock, telecommunications clock, and the like, or it may comprise a common relative clock which is provided with a common seed time through any number of different available wireless signals. Furthermore, instead of the white space pilot table 1510 (FIG. 15A), the white space device 1500-A includes a white space pilot module 1513, which works in conjunction with the ATSC signal detector 1505 and the white space signal generator 1509 to select an available white space pilot through external input. Such external input could be input such as an explicit pilot frequency or offset frequency received from another white space device or white space system management device, or by analyzing the white space pilot frequencies of surrounding white space devices to determine a white space pilot.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Figure 16:
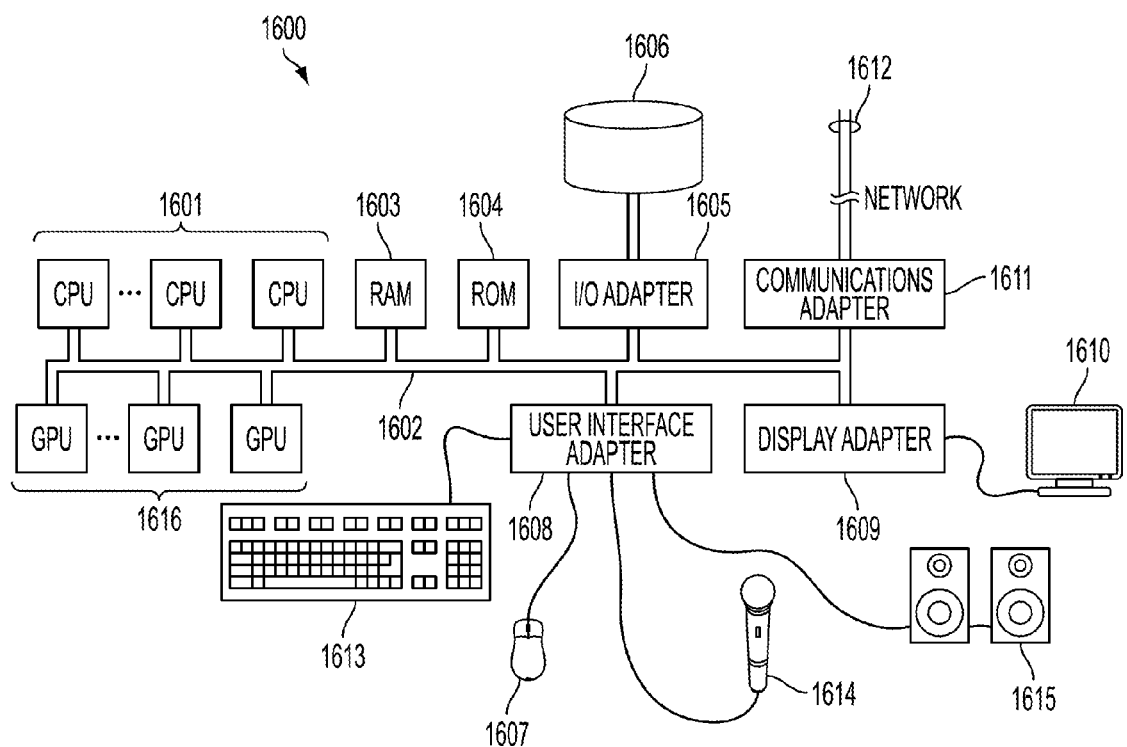
FIG. 16 is a block diagram illustrating a computer system which may be employed to implement various embodiments of the present teachings.

FIG. 16 illustrates an exemplary computer system 1600 which may be employed to implement any of the white space devices configured according to certain embodiments of the present teachings. A central processing unit ("CPU" or "processor") 1601 is coupled to a system bus 1602. The CPU 1601 may be any general-purpose processor. The present disclosure is not restricted by the architecture of the CPU 1601 (or other components of the exemplary computer system 1600) as long as the CPU 1601 (and other components of the exemplary computer system 1600) supports the operations as described herein. As such the CPU 1601 may provide processing to the exemplary computer system 1600 through one or more processors or processor cores. The CPU 1601 may execute the various logical instructions described herein. For example, the CPU 1601 may execute machine-level instructions according to the exemplary operational flow described above in conjunction with FIGS. 8-12. When executing instructions representative of the functionalities illustrated in FIGS. 8-12, the CPU 1601 becomes a special-purpose processor of a special purpose computing platform configured specifically to operate according to the various aspects of the teachings described herein.

The exemplary computer system 1600 also includes random access memory (RAM) 1603, which may be SRAM, DRAM, SDRAM, or the like. The exemplary computer system 1600 includes read-only memory (ROM) 1604 which may be PROM, EPROM, EEPROM, or the like. The RAM 1603 and ROM 1604 hold user and system data and programs, as is well known in the art.

The exemplary computer system 1600 also includes an input/output (I/O) adapter 1605, communications adapter 1611, user interface adapter 1608, and display adapter 1609. The I/O adapter 1605, user interface adapter 1608, and/or the communications adapter 1611 may, in certain aspects, enable a user to interact with the exemplary computer system 1600 in order to input information.

The I/O adapter 1605 couples a storage device(s) 1606, such as one or more of a hard drive, compact disc (CD) drive, floppy disk drive, tape drive, etc., to the exemplary computer system 1600. The storage devices 1606 are utilized in addition to the RAM 1603 for the memory requirements associated with performing the operations associated with the client and proxy multiradio devices and the network servers configured according to various aspects of the present teachings. The communications adapter 1611 is adapted to couple the exemplary computer system 1600 to a network 1612, which may enable information to be input to and/or output from the exemplary computer system 1600 via the network 1612 (e.g., the Internet or other wide-area network, a local-area network, a public or private switched telephony network, a wireless network, or any combination of the foregoing). A user interface adapter 1608 couples user input devices, such as a keyboard 1613, a pointing device 1607, and a microphone 1614 and/or output devices, such as speaker(s) 1615 to the exemplary computer system 1600. The display adapter 1609 is driven by the CPU 1601 or by a graphical processing unit (GPU) 1616 to control the display on a display device 1610, for example, to display an incoming message or call on a client mobile device. A GPU 1616 may be any various number of processors dedicated to graphics processing and, as illustrated, may be made up of one or more individual graphical processors. A GPU 1616 processes the graphical instructions and transmits those instructions to a display adapter 1609. The display adapter 1609 further transmits those instructions for transforming or manipulating the state of the various numbers of pixels used by the display device 1610 to visually present the desired information to a user. Such instructions include instructions for changing state from on to off, setting a particular color, intensity, duration, or the like. Each such instruction makes up the rendering instructions that control how and what is displayed on the display device 1610.

It shall be appreciated that the present disclosure is not limited to the architecture of the exemplary computer system 1600. For example, any suitable processor-based device may be utilized for implementing the cooperative operation of the multiradio devices, including without limitation personal computers, laptop computers, computer workstations, multiprocessor servers, mobile telephones, and other such mobile devices. Moreover, certain aspects may be implemented on application specific integrated circuits (ASICs) or very large scale integrated (VLSI) circuits. In fact, persons of ordinary skill in the art may utilize any number of suitable structures capable of executing logical operations according to the aspects.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method to differentiate a white space signal from a licensed Advanced Television Systems Committee (ATSC) signal, said method comprising:
    modifying a waveform of said white space signal, said white space signal having a pilot signal and being an unlicensed ATSC signal, and said modifying comprising:
        shifting a frequency of said pilot signal outside of at least one frequency range associated with said licensed ATSC signal.

2. The method of claim 1 wherein shifting comprises:
    shifting said frequency of said pilot signal to a middle frequency of a safe frequency range outside of said at least one frequency range;
    sweeping said frequency of said pilot signal between a set of selected frequencies within said safe frequency range; or
    varying said frequency of said pilot signal over time between said set of selected frequencies within said safe frequency range.

3. The method of claim 1 further comprising: quieting a transmitter during sensing operations.

4. The method of claim 2 further comprising: embedding communication data in said modified waveform, said communication data directed to a white space device.

5. The method of claim 4 wherein embedding said communication data comprises:
sweeping said frequency of said pilot signal through said selected frequencies at a rate decodable as said communication data.

6. A white space device comprising:
a memory unit; and
at least one processor coupled to said memory unit; said at least one processor being configured:
to modify a waveform of white space signals, said white space signal having a pilot signal and being an unlicensed Advanced Television Systems Committee (ATSC) signal, and said modified waveform comprising:
a pilot signal having a frequency shifted outside of at least one frequency range associated with a licensed ATSC signals.

7. The white space device of claim 6 wherein said at least one processor is further configured:
to shift said pilot signal to a middle frequency of a safe frequency range outside of said at least one frequency range;
to sweep said pilot signal to selected frequencies within said safe frequency range; or
to vary said pilot signal with time between a set of selected frequencies within said safe frequency range.

8. The white space device of claim 6 wherein said at least one processor is further configured to embed communication data in said modified waveform, said communication data directed to at least another white space device.

9. A non-transitory computer-readable medium including program code stored thereon, comprising:
a non-transitory computer-readable medium having program code recorded thereon, the program code comprising:
program code to modify a waveform of a white space signal, said white space signal having a pilot signal and being an unlicensed Advanced Television Systems Committee (ATSC) signal, and said program code to modify comprising:
program code to shift a frequency of said pilot signal outside of at least one frequency range associated with a licensed ATSC signal; and
program code to transmit said modified waveform.

10. The non-transitory computer-readable medium of claim 9 wherein said program code to shift comprises:
program code to shift said frequency of said pilot signal to a middle frequency of a safe frequency range outside of said at least one frequency range;
program code to said frequency of said pilot signal between a set of selected frequencies within said safe frequency range; or
program code to vary said frequency of said pilot signal over time within said safe frequency range.

11. The non-transitory computer-readable medium of claim 9 further comprising program code to quiet a transmitter during sensing operations.

12. The non-transitory computer-readable medium of claim 10 further comprising program code to embed communication data in said modified waveform, said communication data directed to a white space device.

13. The non-transitory computer-readable medium of claim 12 wherein said program code to embed comprises:
program code to sweep said frequency of said pilot signal through said selected frequencies at a rate decodable as said communication data.

14. A system to differentiate a white space signal from a licensed Advanced Television Systems Committee (ATSC) signal, said system comprising:
means for modifying a waveform of said white space signal, said white space signal having a pilot signal and being an unlicensed ATSC signal, and said means for modifying comprising:
means for shifting a frequency of said pilot signal outside of at least one frequency range associated with said licensed ATSC signal.

15. The system of claim 14 wherein said means for shifting comprises:
means for shifting said frequency of said pilot signal to a middle frequency of a safe frequency range outside of said at least one frequency range;
means for sweeping said frequency of said pilot signal between a set of selected frequencies within said safe frequency range; or
means for varying said frequency of said pilot signal over time between said set of selected frequencies within said safe frequency range.

16. The system of claim 15 further comprising: means for embedding communication data in said modified waveform, said communication data directed to a white space device.

17. A method for distinguishing between a white space signal and an licensed Advanced Television Systems Committee (ATSC) signal, said method comprising:
detecting a modified waveform in a white space signal having a pilot signal, and said modified waveform comprising:
a pilot signal having a frequency outside at least one frequency range associated with said licensed ATSC signal; or
at least one quiet period within said white space signal; and
determining said white space signal is an unlicensed ATSC signal based at least in part on said modified waveform.

18. The method of claim 17, wherein detecting said modified waveform comprises:
analyzing a signal power of said white space signal;
responsive to said signal power exceeding a predetermined threshold:
measuring a signal strength of said white space signal;
detecting at least one drop in signal strength over said measurement;
comparing said at least one drop to a quiet time period; and
responsive to said at least one drop matching said quiet time period within an error window, determining said white space signal is said unlicensed ATSC signal;
responsive to said signal power failing to exceed said predetermined threshold:
calculating a power spectral density (PSD) of said white space signal;
detecting a pilot signal of said white space signal in said PSD;
identifying at least one pilot drop of said pilot signal in said PSD;
comparing said at least one pilot drop to said quite time period; and responsive to said at least one drop matching said quiet time period within said error window, determining said white space signal is said unlicensed ATSC signal.

19. A white space device comprising:
a memory unit; and
at least one processor coupled to said memory unit, said at least one processor being configured:
to detect a modified waveform in white space signal having a pilot signal, said modified waveform comprising:
a pilot signal having a frequency outside at least one frequency range associated with a licensed Advanced Television Systems Committee (ATSC) signal;
at least one quiet period within said white space signal; and
to determine said white space signal is an unlicensed ATSC signal in response to detection of said modified waveform.

20. The white space device of claim 19 wherein said at least one processor is further configured:
to analyze a signal power of said white space signal;
responsive to said signal power exceeding a predetermined threshold, said at least one processor being further configured:
to measure a signal strength of said white space signal;
to detect at least one drop in signal strength over said measurement;
to compare said at least one drop to a quiet time period; and
to determine said white space signal is said unlicensed ATSC signal responsive to said at least one drop matching said quiet time period within an error window;
responsive to said signal power failing to exceed said predetermined threshold, said at least one processor being further configured:
to calculate a power spectral density (PSD) of said white space signal;
to detect a pilot signal of said white space signal in said PSD;
to identify at least one pilot drop of said pilot signal in said PSD;
to compare said at least one pilot drop to said quite time period; and
to determine said white space signal is said unlicensed ATSC signal responsive to said at least one drop matching said quiet time period within said error window.

21. A non-transitory computer-readable medium including program code stored thereon, comprising:
a non-transitory computer-readable medium having program code recorded thereon, said program code comprising:
program code to detect a modified waveform in whitespace signal having a pilot signal, wherein said modified waveform comprising:
a pilot signal having a frequency outside at least one frequency range associated with a licensed Advanced Television Systems Committee (ATSC) signal; or
at least one quiet period within said whitespace signal; and
program code-to determine said white space signal is an unlicensed ATSC signal in response to detection of said modified waveform.

22. The non-transitory computer-readable medium of claim 21, wherein said program code to detect said modified wave form further comprises:
program code to analyze a signal power of said white space signal;
responsive to said signal power exceeding a predetermined threshold, said program code further comprising:
program code to measure a signal strength of said white space signal;
program code to detect at least one drop in signal strength over said measurement;
program code to compare said at least one drop to a quiet time period; and
responsive to said at least one drop matching said quiet time period within an error window, said program code further comprising program code to determine said white space signal is said unlicensed ATSC signal;
responsive to said signal power failing to exceed said predetermined threshold, said program code further comprising:
program code to calculate a power spectral density (PSD) of said white space signal;
program code to detect a pilot signal of said white space signal in said PSD;
program code to identify at least one pilot drop of said pilot signal in said PSD;
program code to compare said at least one pilot drop to said quite time period; and
responsive to said at least one drop matching said quiet time period within said error window, said program code further comprising program code to determine said white space signal is said unlicensed ATSC signal.

23. A system for distinguishing between a white space signal and a licensed Advanced Television Systems Committee (ATSC) signal, said system comprising:
means for detecting a modified waveform in said white space signal having a pilot signal, wherein said modified waveform comprises:
a pilot signal having a frequency outside at least one frequency range associated with said licensed ATSC signal; or
at least one quiet period within said white space signal; and
means-for determining said white space signal is an unlicensed ATSC signal in response to detection of said modified waveform.

24. A method for establishing communication between at least two white space devices, said method comprising:
receiving a white space signal having a pilot signal at a first white space device, said white space signal being an unlicensed Advanced Television Systems Committee (ATSC) signal;
detecting modulation of a watermark signal embedded in said white space signal;
demodulating said watermark signal into communication data; and
establishing communication with a second white space device based on said communication data.

25. The method of claim 24 wherein said watermark signal is: a pseudo noise (PN) sequence; or a set of embedded tones.

26. A method for establishing communication between at least two white space devices, said method comprising:
receiving white space signal at a first white space device, said white space signal being an unlicensed Advanced Television Systems Committee (ATSC) signal;

searching for two tones embedded in said white space signal;
detecting an active one of said two tones;
decoding said white space signal into a prefix free code based on said detected active one of said two tones; and
establishing communication with a second white space device using said prefix free code.

\* \* \* \* \*